(12) United States Patent
Oouchi

(10) Patent No.: US 6,175,791 B1
(45) Date of Patent: Jan. 16, 2001

(54) DSRC CAR-MOUNTED EQUIPMENT

(75) Inventor: Jun Oouchi, Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/379,351

(22) Filed: Aug. 23, 1999

(30) Foreign Application Priority Data

Mar. 25, 1999 (JP) .................................................. 11-081294

(51) Int. Cl.⁷ ...................................................... G06F 7/00
(52) U.S. Cl. .................................. 701/36; 701/9; 701/66; 340/425.5; 340/438
(58) Field of Search .................................... 701/9, 10, 36, 701/49, 66; 340/425.5, 438, 449

(56) References Cited

U.S. PATENT DOCUMENTS

| 5,513,107 | * | 4/1996 | Gormley | ................................. | 701/48 |
| 6,011,320 | * | 1/2000 | Miyamoto et al. | ................. | 307/10.2 |
| 6,061,029 | * | 5/2000 | Hisada | ................................... | 343/713 |

* cited by examiner

Primary Examiner—William A. Cuchlinski, Jr.
Assistant Examiner—Gertrude Arthur
(74) Attorney, Agent, or Firm—Sughrue, Mion, Zinn, Macpeak & Seas, PLLC

(57) ABSTRACT

A DSRC car-mounted equipment which prevents an IC card from being inserted when the temperature lies outside a tolerable temperature range, in order to avoid the thermal deformation and low-temperature breakage of the IC card. The DSRC car-mounted equipment comprises a communication control unit for executing a dedicated narrow-range communication with an on-the-road equipment 1, an IC card accommodation portion 9, a contact portion 10 connected to an electrode portion D of the IC card, a car-mounted equipment controller for reading and writing data to, and from, the IC card, a circuit board 8 constituting the IC card accommodation portion, temperature sensors 11 and 12 disposed near the IC card accommodation portion, a temperature-judging unit for judging whether the temperature data are within the temperature range tolerated by the IC card, and alarm unit 6 and 7 for producing an alarm when the temperature data lie outside the tolerable temperature range.

12 Claims, 4 Drawing Sheets

DSRC CAR-MOUNTED EQUIPMENT

BACKGAOUND OF THE INVENTION

1. Field of the Invention

The present invention relates to a car-mounted equipment for a dedicated short-range communication (hereinafter abbreviated as "DSRC") used in intelligent transport systems (hereinafter abbreviated as "ITS") such as ETC (electronic toll collection system) and the like systems. More specifically, the invention relates to a DSRC car-mounted equipment which executes data processing by using an IC card, and blocks the insertion of the IC card when the temperature is high or low to prevent the IC card from thermally deformed.

2. Description of the Prior Art

The DSRC car-mounted equipment used for the ITS (ETC, etc.) generally uses an IC card that works as a removable external storage medium. As is well known, the IC card is driven upon the input of a password and stores personal data (charge transfer data, etc.) which can be read out as required.

FIG. 6 is a block diagram schematically illustrating a conventional DSRC car-mounted equipment. In FIG. 6, an on-the-road equipment 1 is installed on a road on where a vehicle travels. A DSRC car-mounted equipment (hereinafter simply referred to as "car-mounted equipment") 2 executes a dedicated short-range communication with the on-the-road equipment 1.

The car-mounted equipment 2 is equipped with the following elements 3 to 10.

An antenna 3 transmits and receives transmission signals W2 and reception signals W1 to, and from, the on-the-road equipment 1. Electronic circuits 4 and 5 include a communication control unit, a car-mounted equipment controller, etc. A display unit 6 displays a variety of information. A buzzer unit 7 produces voice and the like. On a circuit board 8 are mounted the antenna 3, electronic circuits 4 and 5, display unit 6 and buzzer unit 7.

An IC card accommodation portion 9 in which an IC card C is detachably accommodated is constituted by a casing of the car-mounted equipment 2 and the circuit board 8, and has an opening 9a.

A contact portion 10 is provided in the inner surface of the circuit board 8 so as to be electrically connected to an electrode D of the IC card C and is exposed in the IC card accommodation portion 9.

The communication control unit in the electronic circuits 4 and 5 demodulates reception signals W1 received from the on-the-road equipment 1 through the antenna 3, forms necessary transmission signals W2, and transmits the transmission signals W2 to the on-the-road equipment 1 through the antenna 3.

The IC card C works as an external storage medium from which data are read out or on which data are written by the car-mounted equipment controller in the electronic circuits 4 and 5.

The display unit 6 and the buzzer unit 7 constitute an information means for informing required data of the car-mounted equipment controller.

Next, described below is the operation of the conventional car-mounted equipment 2 shown in FIG. 6.

First, a driver who gets into the vehicle starts the engine, actuates the car-mounted equipment 2, inserts the IC card C in the IC card accommodation portion 9, and manipulates switches (not shown) arranged around the display unit 6 to input a password and the like.

Then, the car-mounted equipment controller in the electronic circuits 4 and 5 starts functioning, reads necessary data from the IC memory (not shown) embedded in the IC card through the electrode portion D and the contact portion 10, exchanges various data relative to the on-the-road equipment 1, and writes necessary data after the data processing into the IC memory in the IC card C.

After the use of the car-mounted equipment 2, the driver removes the IC card C to secure the car-mounted equipment 2 and the IC card C.

That is, specific data of the IC card C prevents the car-mounted unit 2 and the IC card C from being used in an unauthorized manner.

Here, the main body of the IC card C is made of a plastic material and is susceptible to a change in the temperature compared with the car-mounted equipment 2. It has been known that the temperature range which can be tolerated by the IC card C and in which the IC card C can be used is from about −10 to about +60° C., which is narrower than that of the car-mounted equipment 2 (operation range: from about −30° C. to about +85° C., preservation range: from about −40 to about +105° C.).

In midsummer, for example, the temperature in the closed vehicle easily exceeds the upper-limit value of the temperature range which is tolerated by the IC card C. In midwinter, on the other hand, the temperature easily drops below the lower-limit value of the temperature range tolerated by the IC card C.

However, the IC card C is inserted in the car-mounted equipment 2 based solely upon the will of the driver irrespective of the temperature in the car-mounted equipment 2. When the IC card C is inserted under a condition where the temperature in the car-mounted equipment 2 is lying outside the temperature range tolerated by the IC card, however, the IC card C may be damaged due to thermal deformation.

In summer, the temperature of the car-mounted equipment 2 placed on the dashboard in a closed vehicle usually rises up to about 100° C., and it is probable that the IC card C may be inserted before the temperature drops down to the temperature range tolerated by the IC card C despite the driver opens the door and actuates the air-conditioning system.

It is probable that when, for example, the temperature is high, then, the IC card C is thermally deformed and thermally damaged due to the conduction of heat from the car-mounted equipment 2 and when the temperature is low, then, the plastic material forming the IC car C is damaged due to a low temperature and the IC wiring is damaged, and the function of the IC card C is damaged.

In general, important and significant data such as transfer of charge, etc. are stored in the IC card C. Accordingly, damage to the IC card C due, for example, to thermal deformation must be avoided as much as possible.

As described above, the conventional DSRC car-mounted equipment is equipped with no means for producing an alarm when the temperature of the IC card accommodation portion 9 deviates from the temperature range tolerated by the IC card C. It is not therefore possible to avoid the breakage of the IC card C due to thermal deformation.

SUMMARY OF THE INVENTION

The present invention was accomplished in order to solve the above-mentioned problem, and its object is to provide a DSRC car-mounted equipment that avoids the breakage of the IC card due to thermal deformation by providing a means which produces an alarm when the temperature is deviated from the temperature range tolerated by the IC card.

The present invention is concerned with a DSRC car-mounted equipment for executing a dedicated narrow-range communication with an on-the-road equipment installed on a road on which a vehicle travels, comprising:

a communication control unit for demodulating the signals received from said on-the-road equipment and for forming signals to be transmitted to said on-the-road equipment;

an IC card accommodation portion in which is removably accommodated an IC card that works as an external storage medium;

a contact portion provided in said IC card accommodation portion and is electrically connected to an electrode portion of said IC card;

a car-mounted equipment controller for reading and writing data to, and from, said IC card;

an information means for informing required data of said car-mounted equipment controller; and a circuit board mounting at least said communication control unit, said car-mounted equipment controller and said information means, and constituting said IC card accommodation portion;

wherein said DSRC car-mounted equipment further comprises:

a temperature sensor disposed near said IC card accommodation portion;

a temperature-judging means for judging whether the temperature data detected by said temperature sensor lies within a temperature range tolerated by said IC card; and an alarm means for producing an alarm when said temperature data is deviated from said tolerable temperature range.

The invention is further concerned with a DSRC car-mounted equipment, wherein said temperature-judging means monitors the temperature data after every predetermined period of time when the temperature data is deviated from said tolerable temperature range, and resets a drive instruction to said alarm means when said temperature data has returned to lie within said tolerable temperature range.

The invention is further concerned with a DSRC car-mounted equipment, wherein said temperature sensor is provided on said circuit board so as to be positioned in said IC card accommodation portion.

The invention is further concerned with a DSRC car-mounted equipment, wherein said temperature sensor is provided on said circuit board so as to be located close to the electrode portion of said IC card.

The invention is further concerned with a DSRC car-mounted equipment, wherein said tolerable temperature range is set to values at which said IC card is not thermally deformed.

The invention is further concerned with a DSRC car-mounted equipment, wherein said tolerable temperature range is set to be from −10° C. to +60° C.

The invention is further concerned with a DSRC car-mounted equipment, wherein said alarm means includes at least one of a display unit or a voice unit.

The invention is further concerned with a DSRC car-mounted equipment, wherein said alarm means is constituted by said information means.

The invention is further concerned with a DSRC car-mounted equipment, wherein said temperature-judging means is included in said car-mounted equipment controller.

The invention -is further concerned with a DSRC car-mounted equipment, wherein:

a shape memory alloy is provided in at least a portion of said IC card accommodation portion in which said IC card will be inserted; and said shape memory alloy permits said IC card to be inserted in said IC card accommodation portion when said temperature data lies within said tolerable temperature range and blocks the insertion of said IC card in said IC card accommodation portion when said temperature data is deviated from said tolerable temperature range.

The present invention is further concerned with a DSRC car-mounted equipment for executing a dedicated narrow-range communication with an on-the-road equipment installed on a road on which a vehicle travels, comprising:

a communication control unit for demodulating the signals received from said on-the-road equipment and for forming signals to be transmitted to said on-the-road equipment;

an IC card accommodation portion in which is removably accommodated an IC card that works as an external storage medium;

a contact portion provided in said IC card accommodation portion and is electrically connected to an electrode portion of said IC card;

a car-mounted equipment controller for processing data relative to said IC card;

an information means for informing the result of data processing of said car-mounted equipment controller; and a circuit board mounting at least said communication control unit, said car-mounted equipment controller and said information means, and constituting said IC card accommodation portion;

wherein a shape memory alloy is provided in at least a portion of said IC card accommodation portion in which said IC card will be inserted; and said shape memory alloy permits said IC card to be inserted in said IC card accommodation portion when said temperature data lies within said temperature range tolerated by said IC card and blocks the insertion of said IC card in said IC card accommodation portion when said temperature data is deviated from said tolerable temperature range.

The invention is further concerned with a DSRC car-mounted equipment, wherein said shape memory alloy is arranged on the inner wall of an opening of said IC card accommodation portion, is deformed in a direction to open said opening when the temperature in said IC card accommodation portion lies within said tolerable temperature range, and returns in a direction to close said opening when the temperature in said IC card accommodation portion exceeds an upper-limit value of said tolerable temperature range.

DESCRIPTION OF THE PREFERRED EMBODIMENTS

Embodiment 1

An embodiment 1 of the present invention will now be described with reference to the drawings.

Figure 1:
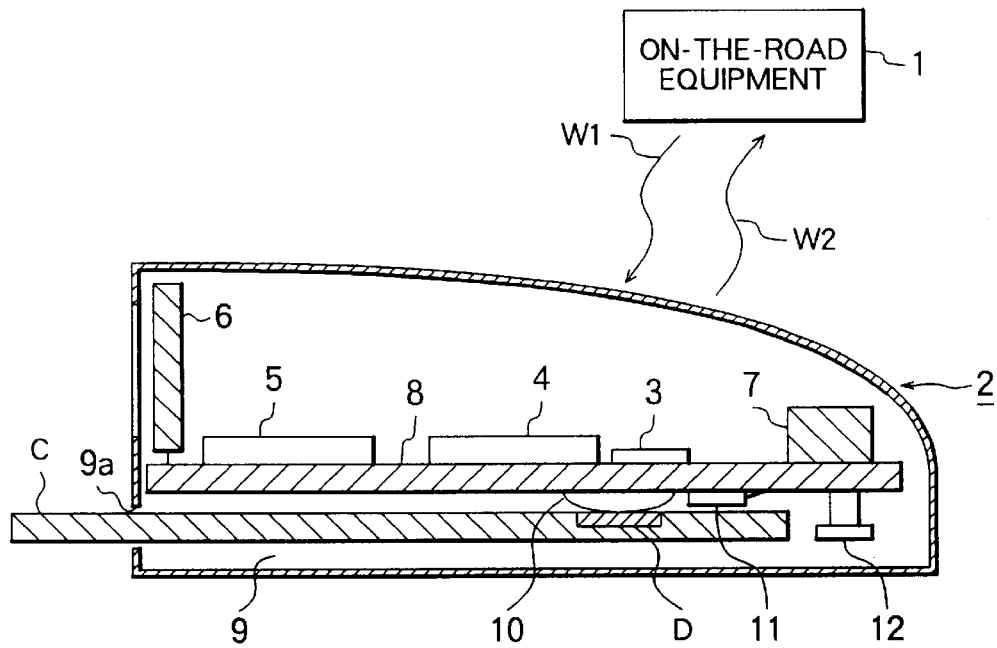
FIG. 1 is a sectional view illustrating an embodiment 1 of the present invention.
Figure 2:
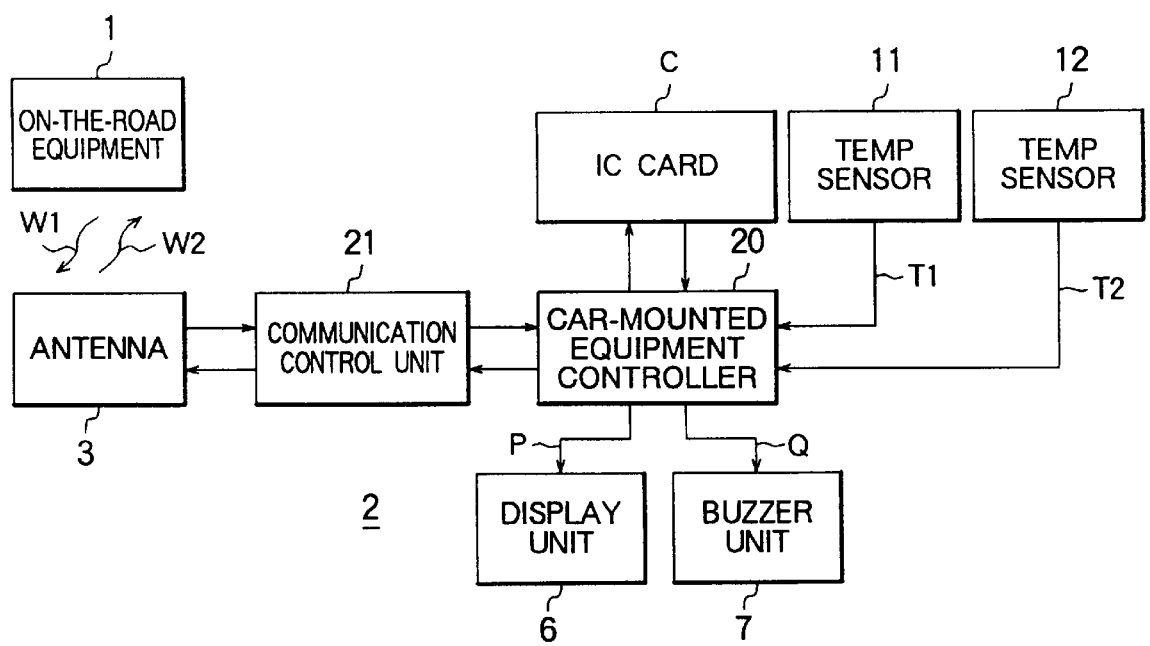
FIG. 2 is a functional block diagram illustrating the embodiment 1 of the present invention.
Figure 3:
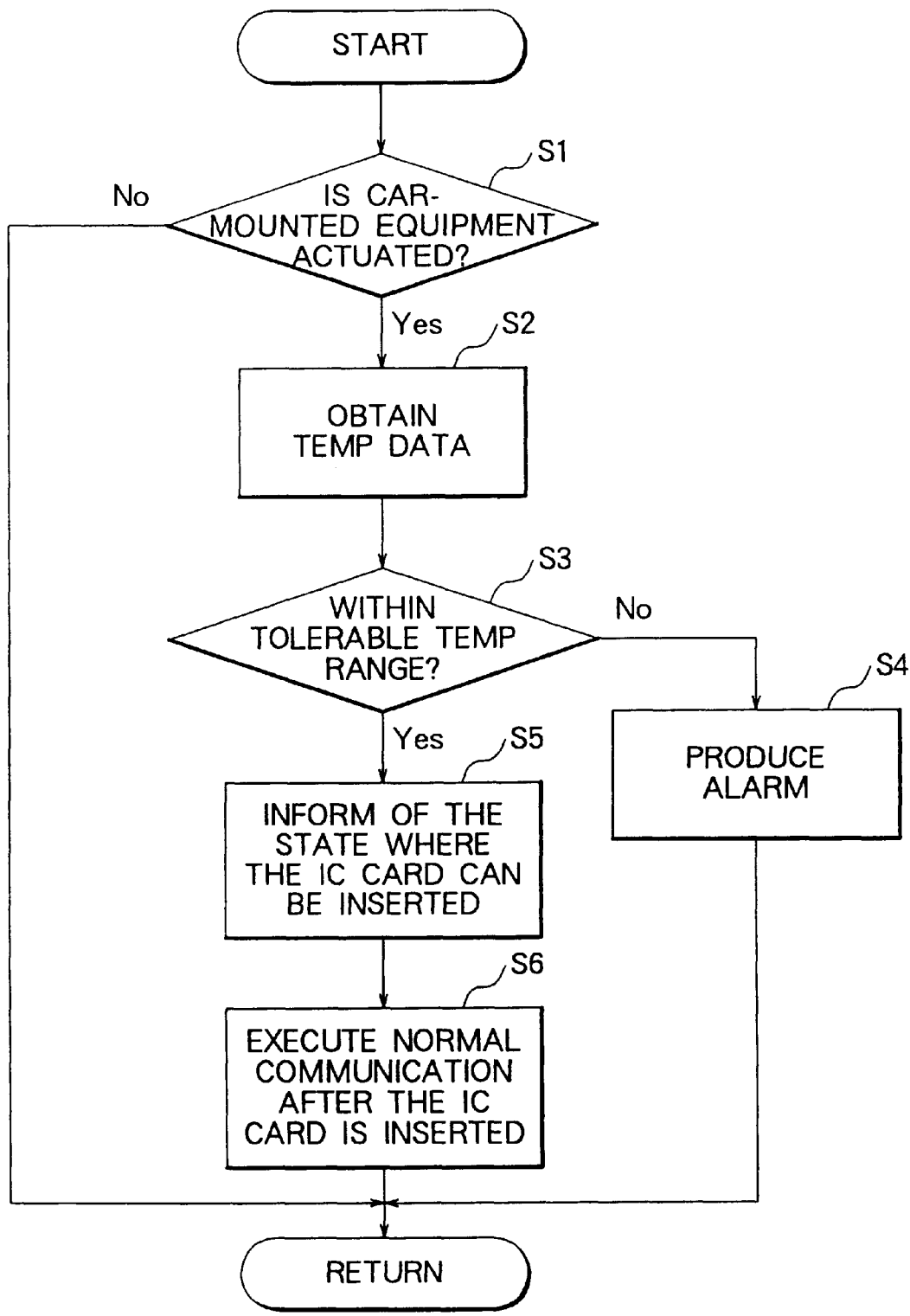
FIG. 3 is a flow chart illustrating the operation of the embodiment 1 of the present invention.

FIGS. 1 and 2 are a sectional view and a functional block diagram illustrating the embodiment 1 of the present invention, and FIG. 3 is a flow chart illustrating the operation of the car-mounted equipment controller in FIG. 2.

Figure 6:
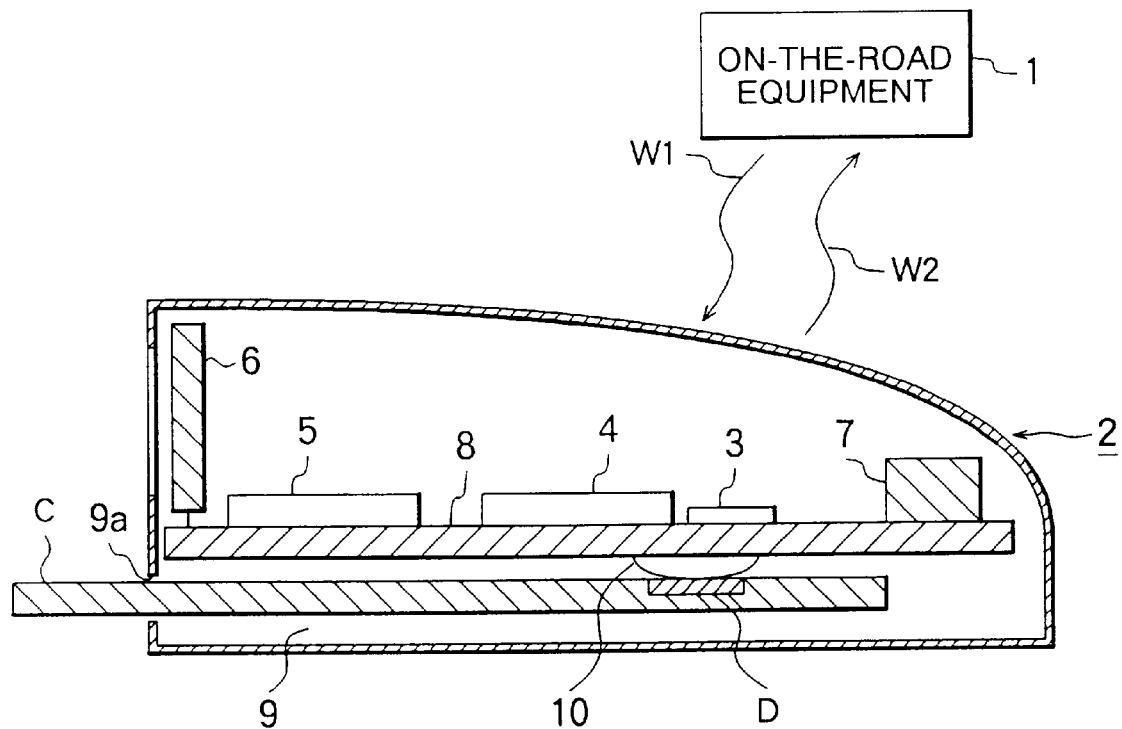
FIG. 6 is a sectional view illustrating a conventional DSRC car-mounted equipment.

In FIG. 1, the components same as those described above (see FIG. 6) are denoted by the same reference numerals but are not described again in detail.

Temperature sensors 11 and 12 are disposed near the IC card accommodation portion 9 to detect the temperature of an environment to which the IC card C is exposed when it is inserted. Here, two temperature sensors 11 and 12 are shown to improve the reliability of the temperature data. The temperature sensors, however, may be provided in any number or in a number of at least only one.

The temperature sensors 11 and 12 are provided on the circuit board 8 so as to be positioned in the IC card accommodation portion 9. One temperature sensor 11 is disposed near the electrode portion D of the IC card C, and the other temperature sensor 12 is disposed to be positioned at an end in the IC card accommodation portion 9.

In this case, the display unit 6 and the buzzer unit 7 also work as an alarm means to produce an alarm when the temperature data detected by the temperature sensors 11 and 12 are deviated from the temperature range tolerated by the IC card C as will be described later.

Either one of the display unit 6 or the buzzer 7 unit may be used as the alarm means for producing alarm when the temperature data has deviated from the tolerable temperature range. Or, an ordinary information device may be provided separately from the display unit 6 and the buzzer unit 7.

In FIG. 2, reference numeral 20 denotes a car-mounted equipment controller comprising a microcomputer for controlling the car-mounted equipment 20, and reference numeral 21 denotes a communication control unit operated under the control of the car-mounted equipment controller 20. These units are constituted by the electronic circuits 4 and 5 in FIG. 1.

A temperature-judging means in the car-mounted equipment controller 20 judges whether the temperature data T1 and T2 detected by the temperature sensors 11 and 12 lie within the tolerable temperature range or not, and an alarm control means produces drive instructions P and Q to the alarm means (display unit 6, buzzer unit 7) when at least either one of the temperature data T1 or T2 is deviated from the tolerable temperature range.

Furthermore, the temperature-judging means monitors the temperature data T1 and T2 after every predetermined period of time when the temperature data T1 and T2 are deviated from the tolerable temperature range, and resets the drive instructions P and Q to the alarm means 6, 7 when the temperature data T1 and T2 have returned to lie within the tolerable temperature range.

The tolerable temperature range is set to values (−10° C. to +60° C.) at which the IC card C is not thermally deformed.

Next, the operation of the embodiment 1 of the present invention shown in FIGS. 1 and 2 will be described with reference to a flow chart of FIG. 3.

First, the car-mounted equipment controller 20 judges whether the car-mounted equipment 2 is actuated or not (step S1). When it is judged that the car-mounted equipment 2 is not actuated (i.e., NO), the routine returns.

When it is judged at the step SI that the car-mounted equipment 2 is actuated (i.e., YES), the temperature data T1 and T2 are obtained from the temperature sensors 11 and 12 at a moment when the car-mounted equipment 2 is actuated, and are monitored (step S2).

It is then judged whether the temperature data T1 and T2 are lying within the tolerable temperature range or not (step S3). When it is judged that the temperature data are lying outside the tolerable temperature range (i.e., NO), drive instructions P and Q are output to the display unit 6 and to the buzzer unit 7 to produce alarm (step S4), and the routine returns.

At the step S4, for example, an alarm indicator on the display unit 6 is flashed or an alarm sound is produced from the buzzer unit 7 to inform the driver of the state where it is inhibited to insert the IC card C in the car-mounted equipment 2.

Therefore, the driver recognizes that the temperature in the IC card accommodation portion 9 is deviating from the tolerable temperature range, and hesitates to insert the IC card C. Accordingly, the IC card C is not damaged.

On the other hand, when it is judged at the step S3 that the temperature data T1 and T2 are within the tolerable temperature range (i.e., YES) owing to the air-conditioning effect in the compartment after the car-mounted equipment 2 has been actuated, the car-mounted equipment controller 20 resets the drive instructions P and Q for alarm, no longer produces the alarm, and informs the driver of a state where the IC card C can be inserted in the car-mounted equipment 2 (step S5).

Then, the driver inserts the IC card C in the IC card accommodation portion 9, and the car-mounted equipment controller 20 commences its normal function to execute the communication control operation after the IC card C is inserted (step S6).

Thus, when the temperature data T1 and T2 from the temperature sensors 11 and 12 lie outside the temperature range tolerated by the IC card. C, the alarm is produced to call the driver's attention before inserting the IC card C. Thus, the IC card C is prevented in advance from being damaged by the thermal distortion.

The temperature sensors 11 and 12 are disposed on the same surface of the circuit board 8 constituting the IC card accommodation portion 9 at positions close to the IC card C and to the contact portion 10. When the IC card C is inserted, therefore, the temperature sensors 11 and 12 reliably detect the temperatures in the IC card accommodation portion 9.

When the car-mounted equipment 2 is actuated, furthermore, the car-mounted equipment controller 20 continues to monitor the temperature data T1 and T2 after every given time cycle t (sec) and, hence, produces the alarm until the temperature returns to the temperature range tolerated by the IC card C to continuously call the driver's attention before inserting the IC card C, and resets the alarm at a moment when the temperature data have reached to lie within the tolerable temperature range.

The temperature range tolerated by the IC card C is not limited to from −10° C. to +60° C., but can be set depending upon the material of the IC card C and an error in the temperature detection.

When, for example, there is an error between the temperature data T1, T2 from the temperature sensors 11, 12 and the temperature data of when the IC card C is really deformed as measured by using a temperature measuring instrument in advance, then, the tolerable temperature range is set by taking the error into consideration. In this case, the tolerable temperature range becomes more reliable.

When the temperature data T1 and T2 lie within the tolerable temperature range, no alarm is produced and, besides, the driver is positively informed of the state where the IC card C can be inserted, demanding the driver to quickly insert the IC card C.

An ordinary information means (display unit 6 and buzzer unit 7) is used as an alarm means, and the temperature-judging means is constituted in the car-mounted equipment controller 20. Thus, no additional element is needed and the cost is not driven up.

Embodiment 2

In the above-mentioned embodiment 1, the alarm was simply produced when the temperature data T1 and T2 were outside the tolerable temperature range. However, the insertion of the IC card may be mechanically blocked.

Figure 4:
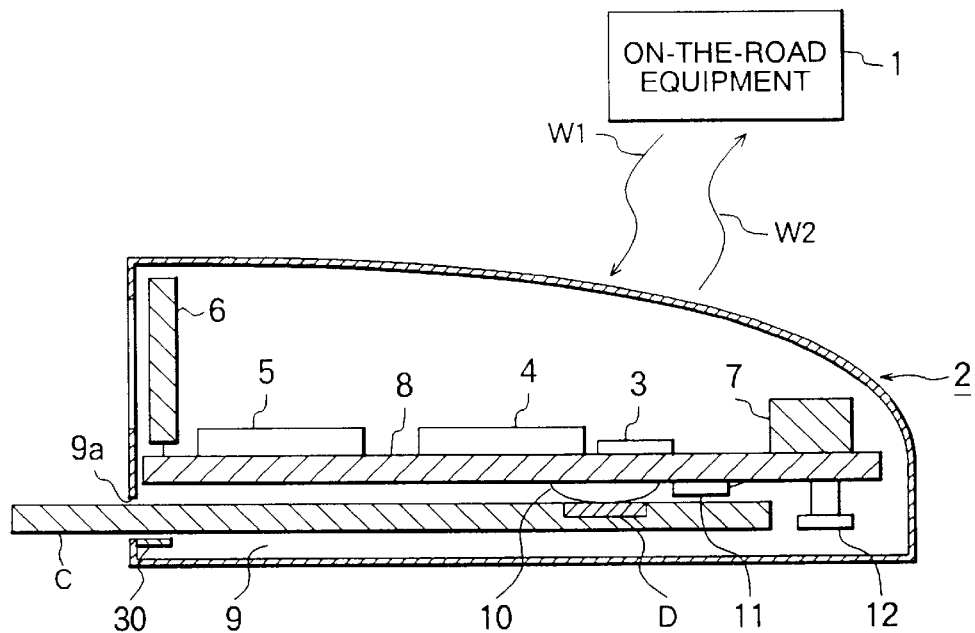
FIG. 4 is a sectional view illustrating an embodiment 2 of the present invention.
Figure 5:
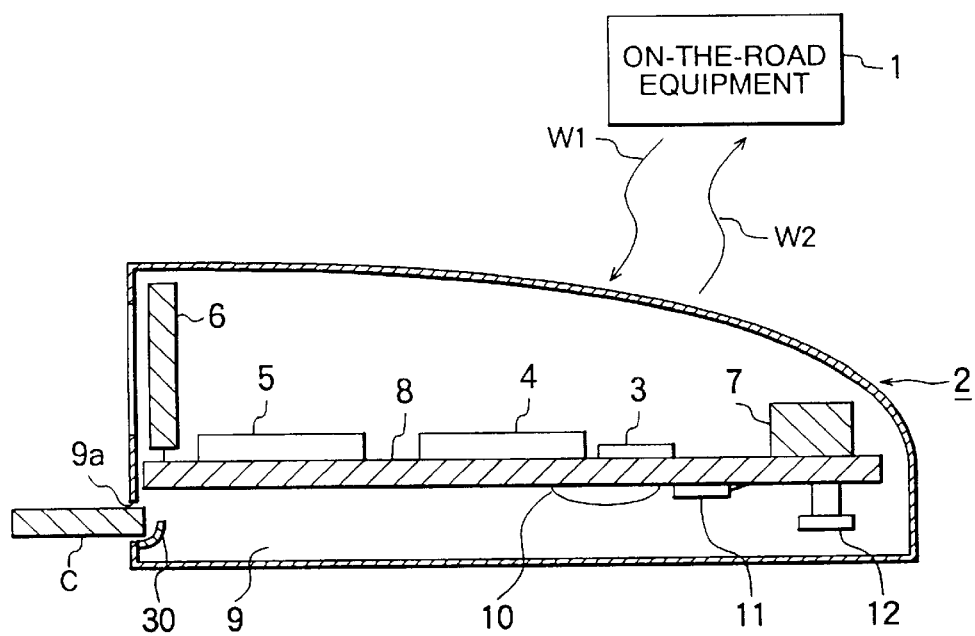
FIG. 5 is a sectional view illustrating the operation of a shape memory alloy according to the embodiment 2 of the present invention.

FIGS. 4 and 5 are sectional views illustrating an embodiment 2 of the present invention in which the insertion of the IC card C is blocked by using a shape memory alloy, wherein FIG. 4 illustrates a case where the temperature in the IC card accommodation portion 9 is within the tolerable temperature range and FIG. 5 illustrates a case where the temperature lies outside the tolerable temperature range.

In FIGS. 4 and 5, a shape memory alloy 30 is provided in at least a portion of the IC card accommodation portion 9 in which will be inserted the IC card C. When the temperature data T1 and T2 lie within the tolerable temperature range, it is allowed to insert the IC card C in the IC card accommodation portion 9. When the temperature data T1 and T2 lie outside the tolerable temperature range, the insertion of the IC card C in the IC card accommodation portion 9 is blocked.

In this case, the shape memory alloy 30 is arranged on the inner wall of the opening 9a of the IC card accommodation portion 9. When the temperature in the IC card accommodation portion 9 lies within the tolerable temperature range, the shape memory alloy 30 is deformed in a direction to open the opening 9a as shown in FIG. 4.

When the temperature in the IC card accommodation portion 9 exceeds the upper-limit value of the tolerable temperature range, the shape memory alloy 30 returns in a direction to close the opening 9a as shown in FIG. 5.

As is widely known, the shape memory alloy 30 comprises Ti—Ni, Cu—Zn or In—Ti, and resumes its shape of before being deformed when the temperature is raised up to its transformation temperature after it is plastically deformed.

Therefore, the shape memory alloy 30 of which the transformation temperature is in agreement with the upper-limit value of the temperature range tolerated by the IC card C is provided at the opening 9a, and is caused to memorize the shape so as to close the opening 9a as shown in FIG. 5. Thereafter, the shape memory alloy 30 is plastically deformed so as to open the opening 9a as shown in FIG. 4.

Upon providing the shape memory alloy 30 as described above, the insertion of the IC card C in the car-mounted equipment 2 is more reliably prevented even when the alarm is neglected by the driver.

Embodiment 3

In the above-mentioned embodiment 2, the shape memory alloy 30 was opened in addition to driving the alarm means 6 and 7. However, the shape memory alloy 30 only may be provided.

In this, the insertion of the IC card C is reliably prevented though only for the upper-limit value of the tolerable temperature range.

What is claimed is:

1. A DSRC car-mounted equipment for executing a dedicated narrow-range communication with an on-the-road equipment installed on a road on which a vehicle travels, comprising:
   a communication control unit for demodulating the signals received from said on-the-road equipment and for forming signals to be transmitted to said on-the-road equipment;
   an IC card accommodation portion in which is removably accommodated an IC card that works as an external storage medium;
   a contact portion provided in said IC card accommodation portion and is electrically connected to an electrode portion of said IC card;
   a car-mounted equipment controller for reading and writing data to, and from, said IC card;
   an information means for informing required data of said car-mounted equipment controller; and
   a circuit board mounting at least said communication control unit, said car-mounted equipment controller and said information means, and constituting said IC card accommodation portion;
   wherein said DSRC car-mounted equipment further comprises:
   a temperature sensor disposed near said IC card accommodation portion;
   a temperature-judging means for judging whether the temperature data detected by said temperature sensor lies within a temperature range tolerated by said IC card; and
   an alarm means for producing an alarm when said temperature data is deviated from said tolerable temperature range.

2. A DSRC car-mounted equipment according to claim 1, wherein said temperature-judging means monitors the temperature data after every predetermined period of time when the temperature data is deviated from said tolerable temperature range, and resets a drive instruction to said alarm means when said temperature data has returned to lie within said tolerable temperature range.

3. A DSRC car-mounted equipment according to claim 1, wherein said temperature sensor is provided on said circuit board so as to be positioned in said IC card accommodation portion.

4. A DSRC car-mounted equipment according to claim 1, wherein said temperature sensor is provided on said circuit board so as to be located close to the electrode portion of said IC card.

5. A DSRC car-mounted equipment according to claim 1, wherein said tolerable temperature range is set to values at which said IC card is not thermally deformed.

6. A DSRC car-mounted equipment according to claim 5, wherein said tolerable temperature range is set to be from −10° C. to +60° C.

7. A DSRC car-mounted equipment according to claim 1, wherein said alarm means includes at least one of a display unit or a voice unit.

8. A DSRC car-mounted equipment according to claim 1, wherein said alarm means is constituted by said information means.

9. A DSRC car-mounted equipment according to claim 1, wherein said temperature-judging means is included in said car-mounted equipment controller.

10. A DSRC car-mounted equipment according to claim 1, wherein:

a shape memory alloy is provided in at least a portion of said IC card accommodation portion in which said IC card will be inserted; and said shape memory alloy permits said IC card to be inserted in said IC card accommodation portion when said temperature data lies within said tolerable temperature range and blocks the insertion of said IC card in said IC card accommodation portion when said temperature data is deviated from said tolerable temperature range.

11. A DSRC car-mounted equipment for executing a dedicated narrow-range communication with an on-the-road equipment installed on a road on which a vehicle travels, comprising:

a communication control unit for demodulating the signals received from said on-the-road equipment and for forming signals to be transmitted to said on-the-road equipment;

an IC card accommodation portion in which is removably accommodated an IC card that works as an external storage medium;

a contact portion provided in said IC card accommodation portion and is electrically connected to an electrode portion of said IC card;

a car-mounted equipment controller for processing data relative to said IC card;

an information means for informing the result of data processing of said car-mounted equipment controller; and a circuit board mounting at least said communication control unit, said car-mounted equipment controller and said information means, and constituting said IC card accommodation portion;

wherein a shape memory alloy is provided in at least a portion of said IC card accommodation portion in which said IC card will be inserted; and said shape memory alloy permits said IC card to be inserted in said IC card accommodation portion when said temperature data lies within said temperature range tolerated by said IC card and blocks the insertion of said IC card in said IC card accommodation portion when said temperature data is deviated from said tolerable temperature range.

12. A DSRC car-mounted equipment according to claim 11, wherein said shape memory alloy is arranged on the inner wall of an opening of said IC card accommodation portion, is deformed in a direction to open said opening when the temperature in said IC card accommodation portion lies within said tolerable temperature range, and returns in a direction to close said opening when the temperature in said IC card accommodation portion exceeds an upper-limit value of said tolerable temperature range.

* * * * *